UNITED STATES PATENT OFFICE 2,111,307

MINERAL OIL COMPOSITION

Thomas W. Bartram, Nitro, W. Va., assignor, by mesne assignments, to Monsanto Chemical Company, St. Louis, Mo., a corporation of Delaware No Drawing. Application September 12, 1935, Serial No. 40,308

4 Claims. (Cl. 44—9)

The present invention relates to a composition of matter comprising oil products for use as liquid fuels in internal combustion engines, as lubricating oils, as transformer oils, as a circulating medium in oil heating systems, and the like.

One object of the present invention is to provide a new treated oil composition possessing desirable stabilizing properties.

Another object of the present invention is to provide a new mineral oil product possessing improved properties particularly for use as a fuel for internal combustion engines. The treating means and special compositions disclosed herein are likewise adaptable for use as a transformer oil, as a lubricating means, as a heat circulating medium and analogous uses wherein it is desirable that an improved and satisfactorily stable mineral oil product be employed.

It is well known that combustible liquids derived from mineral oils before the usual refining processes, frequently and in some cases invariably, contain a proportion of ingredients which give rise to resin formation. This is particularly the case with various fractions of oils produced by different refining and treating means from various crude oils. Immediately and for a short time after distillation, such unrefined motor fuel, for example cracked gasoline, may be comparatively free from nonvolatile resinous matter, but on storage or when used in internal combustion engines give rise to resinous material.

A further object of the present invention is to substantially prevent or greatly reduce the resin formation in such liquids, thus rendering it possible to store them for substantially long periods of time without deterioration and to use them satisfactorily as fuels in internal combustion engines, thus avoiding or considerably reducing refining losses.

It has been recognized that if the above mentioned fuels could be treated in some manner which would prevent resin formation there would be a great advantage in using such fuel which has been refined as little as possible in view of the economy of utilizing the whole of the unsaturated constituents and also because these constituents possess valuable anti-knock properties.

More particularly, the present invention relates to the incorporation in a mineral oil or material derived therefrom, of a suitable material which greatly inhibits the formation of resin, gum or like deposits.

The class of materials which have been found to possess the desirable qualities set forth in that a small proportion when incorporated in a relatively unstable oil product, for example gasoline, materially increases the stability thereof, comprise cyclohexyl amines. Among the members of this group of compounds which are suitable for use according to the present invention are cyclohexyl amine, cyclohexyl phenyl amine, cyclohexyl alpha naphthyl amine, (2-methyl cyclohexyl) alpha naphthyl amine, (4-methyl cyclohexyl) alpha naphthyl amine, (2-ethyl cyclohexyl) alpha naphthyl amine, (4-ethyl cyclohexyl) alpha naphthyl amine, cyclohexyl ortho toluidine and analogues and equivalents thereof. These compounds may be prepared by any of the well-known methods. Thus cyclohexyl alpha naphthyl amine may readily be prepared by heating cyclohexanol or cyclohexyl amine with alpha naphthyl amine. Also included within the scope of the present invention is the reaction product of cyclohexanone and aniline and more specifically the reaction product of substantially one molecular proportion of cyclohexanone and substantially two molecular proportions of aniline, which product is believed to possess the structural formula of

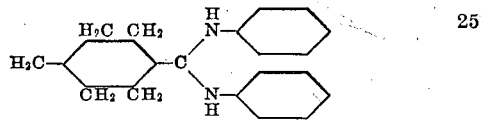

In order to test the gum inhibiting properties of the preferred class of materials the following procedure, which is essentially that described by E. B. Hunn, H. G. M. Fischer and A. J. Blackwood in the Society of Automotive Engineers Journal, vol. 26, #1 (1930), pages 32 and 33, was employed.

Into an Emerson coal calorimeter bomb having a capacity of 500 c. c., a small glass open vessel having a capacity of substantially 150 c. c. was placed, which contained 100 c. c. of an untreated unstable gasoline such as for example a gasoline known as "cracking coil distillate" to which had been added a small proportion of one of the preferred class of materials which may be called "gum inhibitors". The lid was then placed tightly on the bomb. Substantially one hundred pounds pressure of oxygen was then introduced by means of a delivery tube, after which said delivery tube was closed by means of a suitable valve. The bomb was then connected by means of a delivery tube with a pressure gauge after which it was heated preferably by immersing it in a hot water bath maintained at 95 to 98° C. and maintained at said temperature so long as there was no appreciable drop in pressure. A drop in pressure indicates a reaction between the oxygen and the unstable portion of the gasoline. The period of time elapsing before this reaction takes place is indicative of the stability of the gasoline and is known as the induction period. For the special type of gasoline mentioned, that is the unstable gasoline known as "cracking coil distillate", the induction period as hereinafter employed is the time in minutes from the time of the immersion of the bomb in the bath maintained at a temperature of 95-98° C. until there is a drop in pressure of 15 pounds per square inch.

As one specific embodiment of the present invention, but not to be understood as in any sense limitative of the scope thereof, 50 m. g. of cyclohexyl alpha naphthyl amine were dissolved in 100 c. c. of unstable gasoline known as "cracking coil distillate" and a test carried out in the manner described. The induction period was 210 minutes. A test carried out in the manner identical with that given above, with the exception that no gum inhibitor was added showed the unstable gasoline had an induction period of 95 minutes.

If convenient or desirable, if the inhibitor to be added to the unstable oil product, for example gasoline is not readily soluble therein, it may be dissolved in a solvent, for example isopropyl alcohol, benzol and other like solvents fully miscible with said unstable oil product, and the solution of the inhibitor thus prepared added thereto.

As other specific embodiments of the present invention cyclohexyl amine, cyclohexyl phenyl amine and the reaction product of substantially one molecular proportion of cyclohexanone and substantially two molecular proportions of aniline have been incorporated in an unstable cracked gasoline and tested in the manner hereinbefore set forth and found to produce a gasoline of improved properties.

As seen from the above data the preferred class of materials comprise an important class of stabilizers for oil products, such as for example gasoline. Other similar oil compositions designed for particular uses may be prepared in the manner described by merely substituting the desired oil fraction or cut and adding the necessary quantity of gum inhibitor thereto. Other ratios of the preferred class of material than those hereinbefore set forth have been incorporated in an unstable oil product, for example gasoline. Further, other methods of testing than those set forth above may be employed. The invention is limited solely by the following claims.

What is claimed is:

1. A cracked hydrocarbon motor fuel of the type which tends to deteriorate on storage as evidenced by color and gum formation having incorporated therein a small proportion of a cyclohexyl naphthyl amine.

2. Cracked gasoline having incorporated therein a small proportion of a cyclohexyl naphthyl amine.

3. A cracked hydrocarbon motor fuel of the type which tends to deteriorate on storage as evidenced by color and gum formation having incorporated therein a small proportion of cyclohexyl alpha naphthyl amine.

4. Cracked gasoline having incorporated therein a small proportion of cyclohexyl alpha naphthyl amine.

THOMAS W. BARTRAM.